United States Patent
Chen et al.

(10) Patent No.: US 11,770,074 B2
(45) Date of Patent: Sep. 26, 2023

(54) MULTIPHASE POWER CONVERTER HAVING DAISY CHAIN CONTROL CIRCUIT AND METHOD FOR CONTROLLING THE SAME

(71) Applicant: ANPEC ELECTRONICS CORPORATION, Hsinchu (TW)

(72) Inventors: Chih-Yuan Chen, Hsinchu (TW); Ping-Yu Tsai, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 155 days.

(21) Appl. No.: 17/401,806

(22) Filed: Aug. 13, 2021

(65) Prior Publication Data

US 2022/0321013 A1    Oct. 6, 2022

(30) Foreign Application Priority Data

Mar. 31, 2021    (TW) .................................. 110111879

(51) Int. Cl.
*H02M 3/158*    (2006.01)
*H02M 1/088*    (2006.01)

(52) U.S. Cl.
CPC ......... *H02M 3/1584* (2013.01); *H02M 1/088* (2013.01)

(58) Field of Classification Search
None
See application file for complete search history.

(56) References Cited

U.S. PATENT DOCUMENTS

| 9,042,139 | B1* | 5/2015 | Schultz | H02J 3/1842 |
| | | | | 363/72 |
| 11,356,023 | B2* | 6/2022 | Jiang | H02M 3/1584 |
| 11,368,090 | B2* | 6/2022 | Hureau | H02M 3/1584 |
| 11,545,902 | B2* | 1/2023 | Luo | H02M 3/1584 |

\* cited by examiner

*Primary Examiner* — Jeffrey A Gblende

(74) *Attorney, Agent, or Firm* — Li & Cai Intellectual Property (USA) Office

(57) ABSTRACT

A multiphase power converter having a daisy chain control circuit and a method for controlling the same are provided. A main control circuit outputs an initial pulse width modulation signal having a plurality of initial pulses. One of a plurality of slave control circuits is connected to an output terminal of the main control circuit, and outputs a pulse width modulation signal according to the received initial pulse width modulation signal. Each of the rest of the plurality of slave control circuits outputs the next pulse width modulation signal to the next slave control circuit or the main control circuit according to the pulse width modulation signal received from the previous slave control circuit. The main control circuit automatically counts a quantity of the control circuits according to the received pulse width modulation signal and outputted initial pulse width modulation signal.

18 Claims, 10 Drawing Sheets

MULTIPHASE POWER CONVERTER HAVING DAISY CHAIN CONTROL CIRCUIT AND METHOD FOR CONTROLLING THE SAME

CROSS-REFERENCE TO RELATED PATENT APPLICATION

This application claims the benefit of priority to Taiwan Patent Application No. 110111879, filed on Mar. 31, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a multiphase power converter, and more particularly to a multiphase power converter having a daisy chain control circuit and a method for controlling the same.

BACKGROUND OF THE DISCLOSURE

Multiphase power converters are configured to convert a plurality of input voltages into a plurality of output voltages that are provided to a load. The power converters each have a high-side switch and a low-side switch. A conduction period of the high-side switch and a conduction period of the low-side switch affect a current flowing through the load. However, conventional control circuits of the power converter cannot effectively control operations of the high-side switch and the low-side switch, resulting in inadequate currents flowing through the load and circuit components in the power converter.

SUMMARY OF THE DISCLOSURE

In response to the above-referenced technical inadequacy, the present disclosure provides a multiphase power converter having a daisy chain control circuit and a method for controlling the same.

In one aspect, the present disclosure provides a multiphase power converter having a daisy chain control circuit that includes a plurality of power converters. The plurality of power converters each have a control circuit. The control circuits are arranged in sequence with each other. An input terminal of each of the control circuits is connected to an output terminal of the previous control circuit, and the output terminal of each of the control circuits is connected to the input terminal of the next control circuit. The plurality of power converters include a main power converter and a plurality of slave power converters. The control circuit of the main power converter is defined as a main control circuit, and is configured to output an initial pulse width modulation signal having a plurality of initial pulses. The control circuit of each of the plurality of slave power converters is defined as a slave control circuit. The slave control circuit connected to the output terminal of the main control circuit receives the initial pulse width modulation signal from the main control circuit, and obtains one of the initial pulses from the received initial pulse width modulation signal, so as to output a pulse width modulation signal. Each of the slave control circuits that are not directly connected to the main control circuit receives the pulse width modulation signal from the previous slave control circuit, and obtains one of the initial pulses from the received pulse width modulation signal, so as to output the next pulse width modulation signal to the next slave control circuit. The slave control circuit that is connected to the input terminal of the main control circuit obtains one of the initial pulses from the received pulse width modulation signal, so as to output the pulse width modulation signal to the main control circuit. The main control circuit automatically counts a quantity of the control circuits according to the initial pulse width modulation signal and the received pulse width modulation signal.

In certain embodiments, after the main control circuit receives the pulse width modulation signal from the slave control circuit connected to the main control circuit, the main control circuit outputs a counting signal, and automatically counts the quantity of the control circuits during a period of the counting signal.

In certain embodiments, after the period of the counting signal ends, the main control circuit outputs a pulse synchronization signal sequentially transmitted to each of the slave control circuits, so as to control a synchronized operation of the plurality of power converters.

In certain embodiments, after the main control circuit receives the pulse width modulation signal, the main control circuit outputs a pulse synchronization signal sequentially transmitted to each of the slave control circuits, so as to control a synchronized operation of the plurality of power converters.

In certain embodiments, after the main control circuit is synchronized with the slave control circuits, a pulse width of the pulse synchronization signal is different from a width of each of the initial pulses of the initial pulse width modulation signal.

In certain embodiments, after the main control circuit is synchronized with the slave control circuits, the main control circuit outputs a pulse control signal, and a plurality of pulses of the pulse control signal correspondingly activate operations of the main control circuit and the slave control circuits.

In certain embodiments, the output terminal of one of the control circuits is connected to a resistor, so as to set the one of the control circuits as the main control circuit.

In certain embodiments, the output terminal of one of the control circuits is coupled to a reference potential, so as to set the one of the control circuit as the main control circuit.

In another aspect, the present disclosure provides a method for controlling a multiphase power converter having a daisy chain control circuit, which includes setting up a plurality of power converters each having a control circuit, arranging the control circuits in sequence with each other, connecting an input terminal of each of the control circuits to an output terminal of the previous control circuit, connecting the output terminal of each of the control circuits to the input terminal of the next control circuit, setting one of the control circuits as a main control circuit, and setting the rest of the control circuits as a plurality of slave control circuits, using the main control circuit to output an initial pulse width modulation signal having a plurality of initial pulses, using the slave control circuit connected to the output terminal of the main control circuit to receive the initial pulse width modulation signal from the main control circuit and to obtain one of the initial pulses from the received pulse width modulation signal, so as to output a pulse width modulation signal, using each of the slave control circuits that are directly connected to the main control circuit to receive the pulse width modulation signal from the previous slave control circuit and to obtain one of the initial pulses from the received pulse width modulation signal, so as to output the next pulse width modulation signal to the next slave control circuit, using the slave control circuit connected to the input terminal of the main control circuit to obtain one of the initial pulses from the received pulse width modulation signal, so as to output the pulse width modulation signal to the main control circuit, and using the main control circuit to automatically count a quantity of the control circuits according to the initial pulse width modulation signal and the received pulse width modulation signal.

In certain embodiments, the method further includes using the main control circuit to output a counting signal and automatically count the quantity of the control circuits during a period of the counting signal after the main control circuit receives the pulse width modulation signal from the slave control circuit connected to the main control circuit.

In certain embodiments, the method further includes using the main control circuit to output a pulse synchronization signal sequentially transmitted to each of the slave control circuits, so as to control a synchronized operation of the plurality of power converters after the period of the counting signal ends.

In certain embodiments, the method further includes using the main control circuit to output a pulse synchronization signal sequentially transmitted to each of the slave control circuits, so as to control a synchronized operation of the plurality of power converters after the main control circuit receives the pulse width modulation signal.

In certain embodiments, the method further includes using the main control circuit to output a pulse control signal, and using a plurality of pulses of the pulse control signal to correspondingly activate operations of the main control circuit and the plurality of slave control circuits after the main control circuit is synchronized with the plurality of slave control circuits.

In certain embodiments, the method further includes connecting the output terminal of one of the control circuits to a resistor, so as to set the one of the control circuits as the main control circuit.

In certain embodiments, the method further includes coupling the output terminal of one of the control circuits to a reference potential, so as to set the one of the control circuits as the main control circuit.

Therefore, the multiphase power converter having the daisy chain control circuit and the method for controlling the same are provided in the present disclosure. After the power in turned on, the one of the control circuits of the daisy chain control circuit can be automatically determined as the main control circuit, and the rest of the control circuits of the daisy chain control circuit are determined as the slave control circuits. In addition, the quantity of the power converters is automatically determined, and the main control circuit controls the operation of the slave control circuits, so as to provide an appropriate current to the load.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
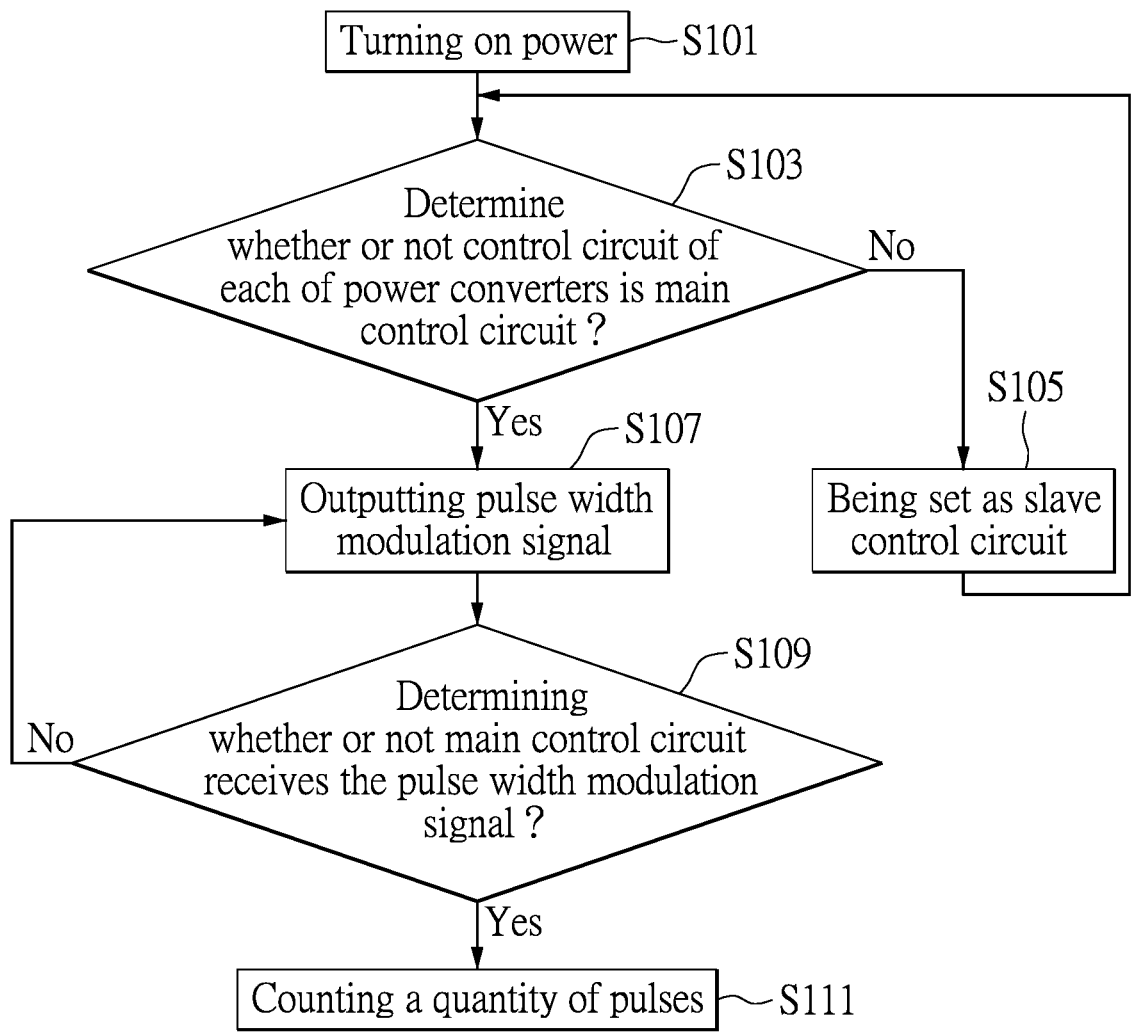
FIG. 1 is a flowchart of a method for controlling a daisy chain control circuit of a multiphase power converter according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
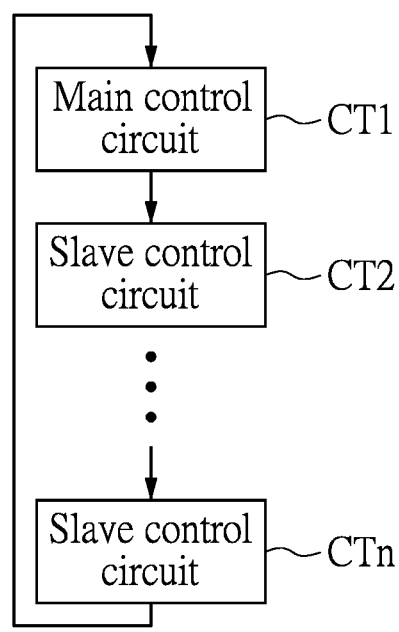
FIG. 2 is a block diagram of the multiphase power converter according to one embodiment of the present disclosure.

Referring to FIG. 1, FIG. 2, FIG. 7 to FIG. 10, FIG. 1 is a flowchart of a method for controlling a daisy chain control circuit of a multiphase power converter according to one embodiment of the present disclosure, FIG. 2 is a block diagram of the multiphase power converter according to one embodiment of the present disclosure, and FIG. 7 to FIG. 10 are schematic signal waveform diagrams of the daisy chain control circuit according to embodiments of the present disclosure.

The method of the present embodiment can include steps S101 to S111 as shown in FIG. 1, and can be applied to a daisy chain control circuit of a multiphase power converter as shown in FIG. 2. A plurality of power converters are set up in the multiphase power converter, and each of the plurality of power converters has a control circuit. As shown in FIG. 2, the daisy chain control circuit of the multiphase power converter can include N control circuits, i.e., a main control circuit CT1 and a plurality of slave control circuits CT2 to CTn, where N represents any appropriate integer number. The control circuits are arranged in sequence with each other. An input terminal of each of the control circuits is connected to an output terminal of the previous control circuit. The output terminal of each of the control circuits is connected to the input terminal of the next control circuit.

Step S101: Turning on a power of the multiphase power converter.

Step S103: Detecting whether or not a parameter of (a specific pin of) the control circuit of each of the power converters comforts to a predetermined parameter of the main control circuit, so as to determine whether or not the control circuit of each of the power converters is the main control circuit CT1. When it is to be determined "No" in step S103, the method proceeds to step S105, so as to determine that such control circuit is one of the slave circuits CT2 to CTn, and then the method proceeds to step S103 for the rest of the control circuits. When it is to be determined "Yes" in step S103, the control circuit is determined as the main control circuit CT1, and the rest of the control circuits are determined as the slave control circuits CT2 to CTn, and then the method proceeds to the next step S107.

Step S107: Using the main control circuit CT1 to output an initial pulse width modulation signal having a plurality of initial pulses, such as an initial pulse width modulation signal PWN1 as shown in FIG. 7, to the slave control circuit CT2 connected to the output terminal of the main control circuit CT1.

Figure 7:
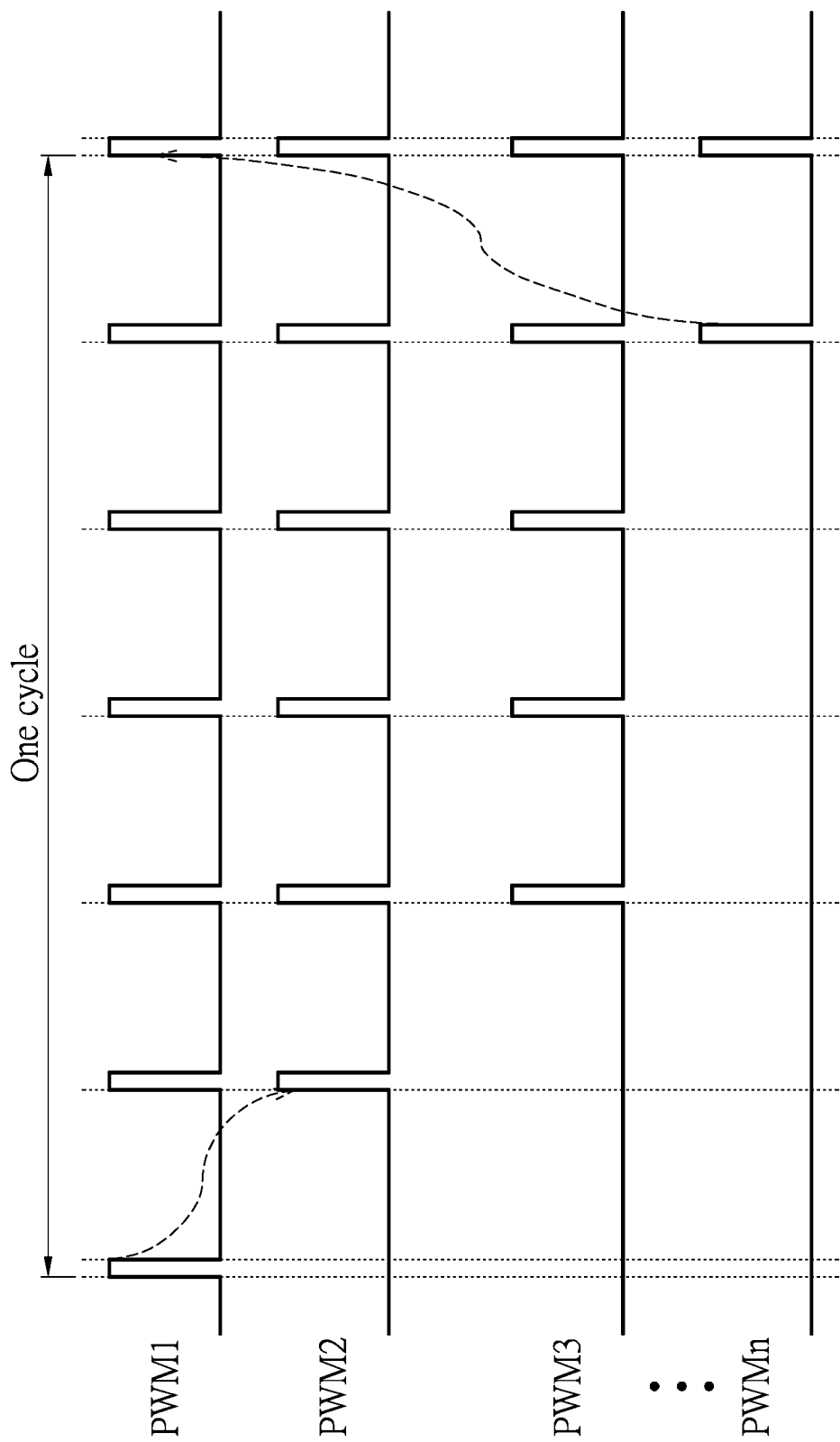
FIG. 7 is a schematic signal waveform diagram of the daisy chain control circuit according to one embodiment of the present disclosure.

In addition, in step S107, the slave control circuit CT2 is used to obtain the first initial pulse from the initial pulse width modulation signal PWM1, so as to output a pulse width modulation signal PWM2 as shown in FIG. 7 to the slave control circuit CT3 connected to the slave control circuit CT2. Next, the slave control circuit CT3 is used to obtain the second initial pulse from the received pulse width modulation signal PWM2, so as to output a pulse width modulation signal PWM3. That is, such the pulse width modulation signal PWM3 has one less pulse than the previous pulse width modulation signal PWM2, and has two less pulses than the initial pulse width modulation signal PWM1.

Step S109: Determining whether or not the main control circuit CT1 receives the pulse width modulation signal PWMn from the slave control circuit CTn connected to the input terminal of the main control circuit CT1, where N can be any integer number. When it is to be determined "No" in step S109, the method returns to step S109, and waits for the slave control circuit CTn to output the pulse width modulation signal PWMn. When it is to be determined "Yes" in step S109, the method proceeds to the next step S111.

Step S111: The main control circuit CT1 automatically counts a quantity of the control circuits set up in the daisy chain control circuit of the multiphase power converter according to the received pulse width modulation signal PWMs and the initial pulse width modulation signal PWM1.

More specifically, the main control circuit CT1 can calculate a difference between a quantity of the pulses of the initial pulse width modulation signal and a quantity of the pulses of the pulse width modulation signal PWMn, so as to calculate a quantity of the slave control circuits CT2 to CTn. The main control circuit CT1 adds the quantity of the slave control circuit CT2 to CTn to the quantity of the main control circuit CT1, which is the quantity of the control circuits set up in the daisy chain control circuit.

Figure 3:
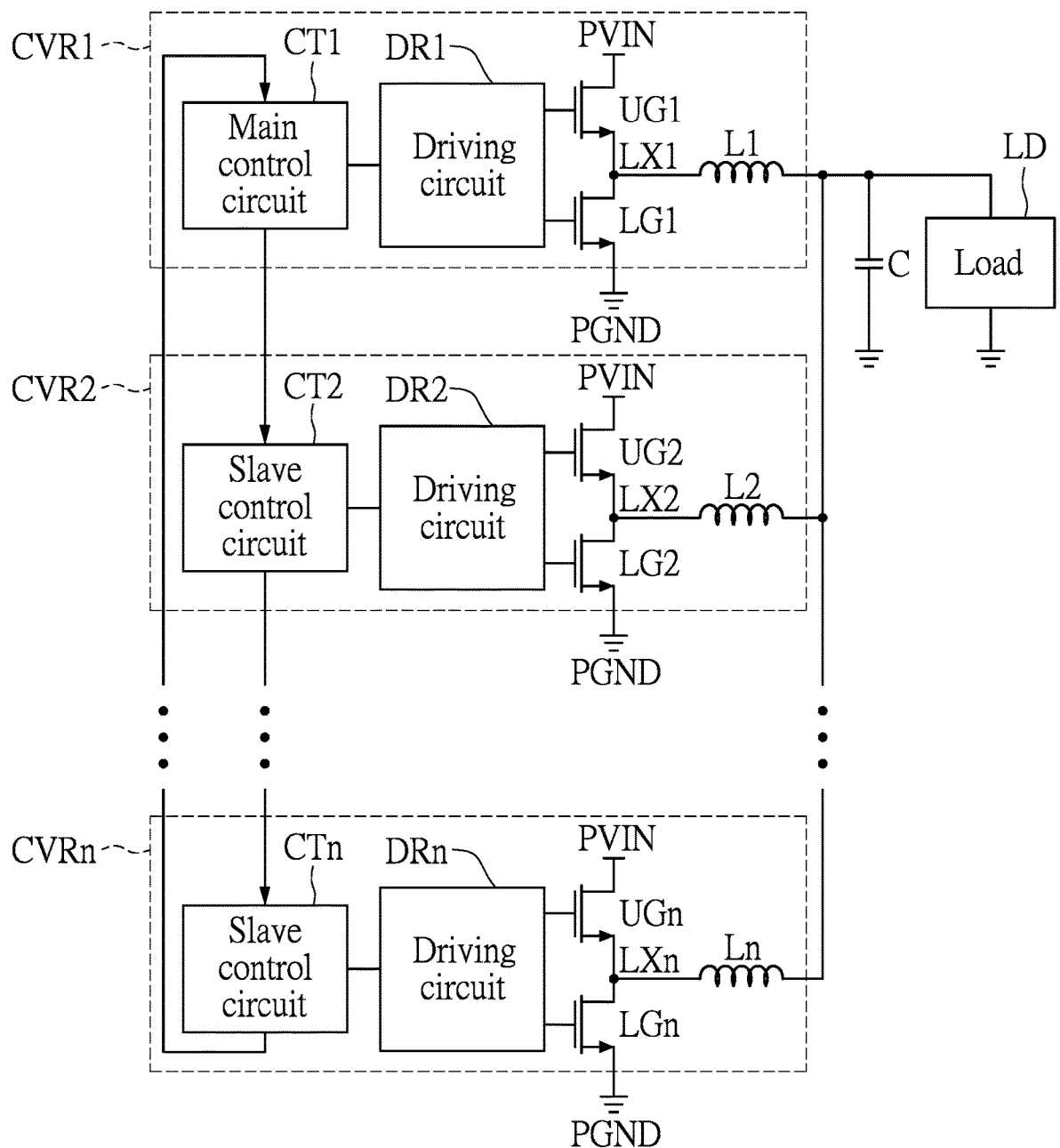
FIG. 3 is a schematic circuit layout diagram of the multiphase power converter according to one embodiment of the present disclosure.
Figure 8:
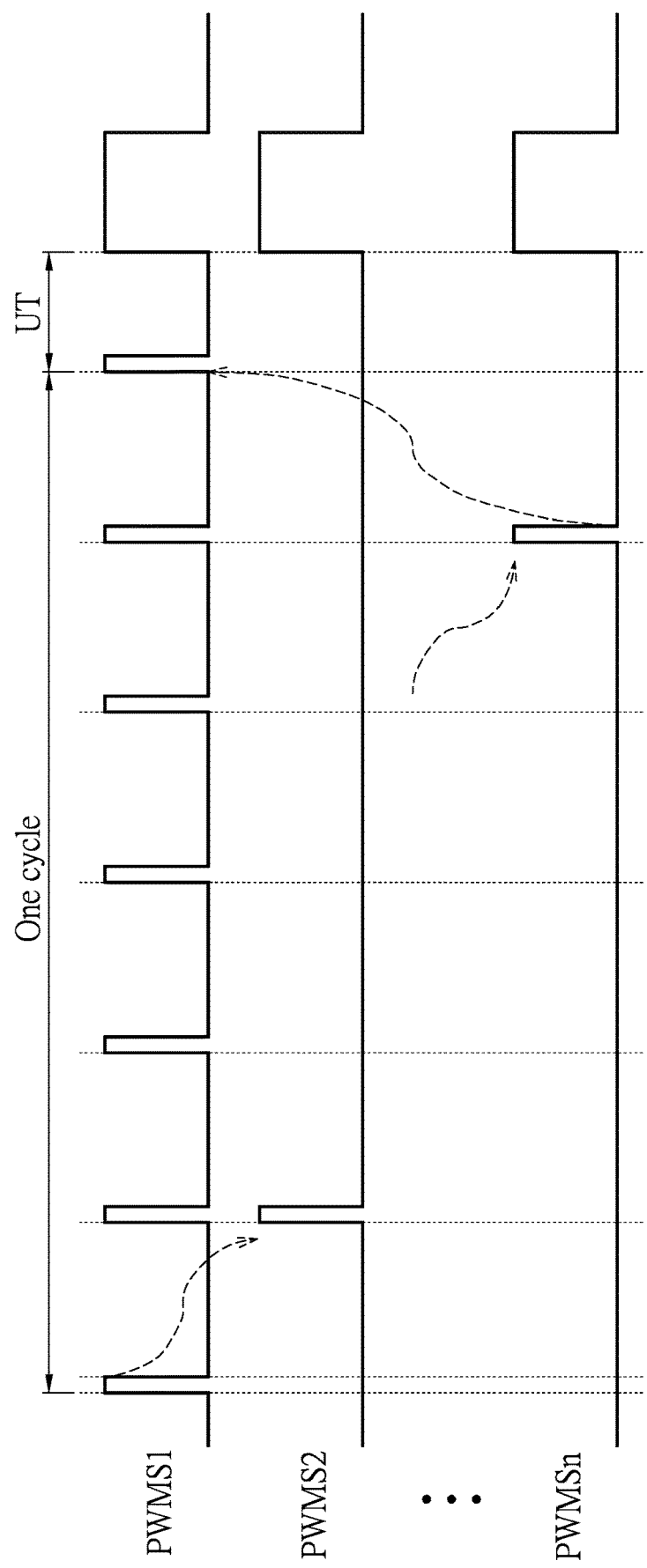
FIG. 8 is a schematic signal waveform diagram of the daisy chain control circuit according to another embodiment of the present disclosure.

That is to say, if n control circuits are set, the plurality of pulses of the initial pulse width modulation signal PWM1 outputted by the main control circuit CT have n pulses as a cycle. The main control circuit CT1 is the first control circuit, and can output pulses of a switch control signal PWMS1 as shown in FIG. 8 according to the first pulse of each of the cycle of the initial pulse width modulation signal PWM1 as shown in FIG. 7. The main control circuit CT1 can output such the switch control signal PWMS1 to a driving circuit DR1 as shown in FIG. 3, so as to control the driving circuit DR1 to drive operations of a high-side switch UG1 and a low-side switch LG1.

The slave control circuit CT2 is the second control circuit, and outputs pulses of a switch control signal PWMS2 as shown in FIG. 8 according to the second pulse of each of the cycle of the initial pulse width modulation signal PWM1 as shown in FIG. 7. The slave control circuit CT2 can output such the switch control signal PWMS2 to a driving circuit DR2 as shown in FIG. 3, so as to control the driving circuit DR2 to drive operations of a high-side switch UG2 and a low-side switch LG2.

The slave control circuit CT3 is the third control circuit, and outputs pulses of a switch control signal PWMS3 as shown in FIG. 8 according to the third pulse of each of the cycle of the initial pulse width modulation signal PWM1 as shown in FIG. 7. The slave control circuit CT3 can output such the switching control signal PWMS3 to a driving circuit DR3 as shown in FIG. 3, so as to control the driving circuit DR3 to drive operations of a high-side switch UG3 and a low-side switch LG3.

After the main control circuit CT1 receives the pulse width modulation signal PWMn outputted by the slave control circuit CTn, or after the slave control circuit CTn outputs a switch control signal PWMSn, the main control circuit CT1 can output a counting signal, which can have a pulse. The main control circuit CT1 automatically counts the quantity of the control circuits set up in the daisy chain control circuit during a (operating) period UT of the counting signal. Alternatively, as shown in FIG. 9, the pulse of the counting signal can be omitted.

After the period UT of the counting signal ends, or after the main control circuit CT1 receives the pulse width modulation signal CTn, the main control circuit CT1 can output a pulse synchronization signal sequentially transmitted to the plurality of slave control circuits CT2 to CTn, so as to synchronize an operation of the main control circuit CT1 and the plurality of slave control circuits CT2 to CTn. A pulse of the pulse synchronization signal can follow after the end of the period UT as shown in FIG. 8, e.g., after the initial pulse width modulation signal CK1 and n periods of each of the pulse width modulation signals CK2 to CKn as shown in FIG. 9.

Figure 9:
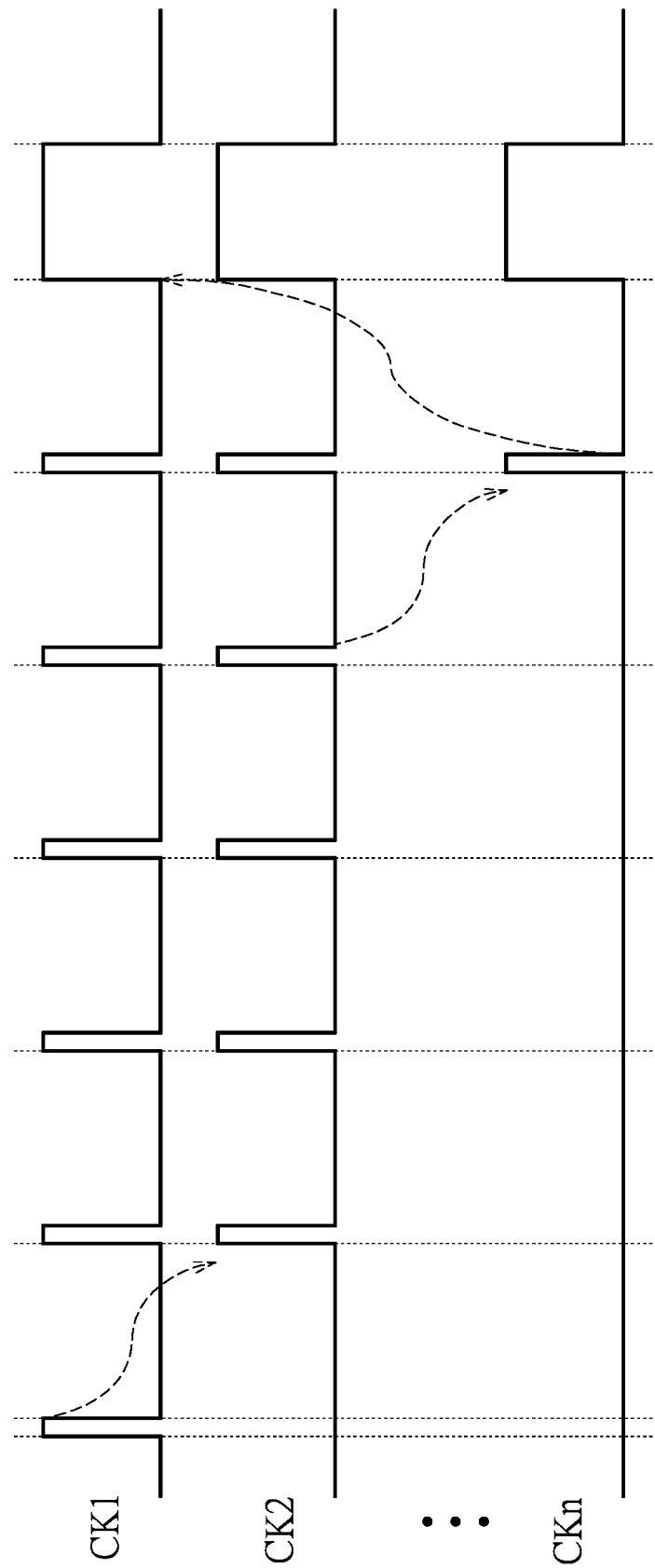
FIG. 9 is a schematic signal waveform diagram of the daisy chain control circuit according to still another embodiment of the present disclosure.
Figure 10:
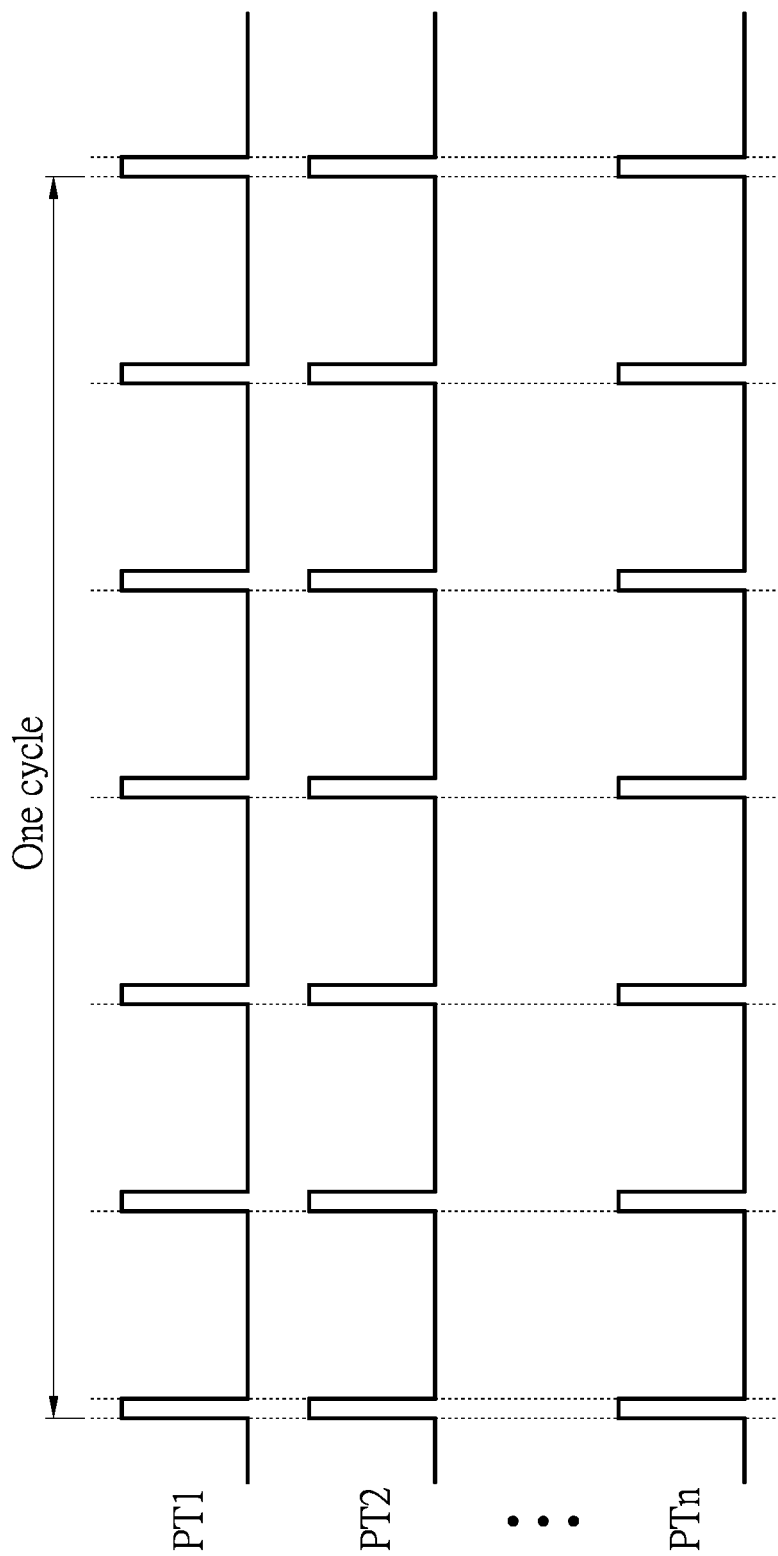
FIG. 10 is a schematic signal waveform diagram of the daisy chain control circuit according to yet another embodiment of the present disclosure.

As shown in FIG. 8 and FIG. 9, a pulse width of the pulse synchronization signal is greater than a width of each pulse of the initial pulse width modulation signal PWM1, but the present disclosure is not limited thereto. In practice, the pulse width of the pulse synchronization signal can be less than or equal to the width of each pulse of the initial pulse width modulation signal PWM1.

After the main control circuit CT1 is synchronized with the plurality of slave control circuits CT2 to CTn, the main control circuit CT1 can output a pulse control signal sequentially transmitted to the slave control circuits CT2 to CTn, where the pulses control signals are represented as the pulse control signals PT1 to PTn according to the output control circuits CT1 to CTn. A quantity of pulses of each of the pulse control signals PT1 to PTn is equal to a quantity of the counted control circuits. The pulses of the pulse control signals PT1 to PTn correspondingly activate the operation of the plurality of slave control circuits, e.g., outputting the switch control signals PWMS1 to PWMSn.

Referring to FIG. 3, FIG. 3 is a schematic circuit layout diagram of the multiphase power converter according to one embodiment of the present disclosure. As shown in FIG. 3, the plurality of power converters including a main power converter CVR1 and a plurality of slave power converters CVR2 to CVRn are set up in the multiphase power converter.

The main power converter CVR1 includes the main control circuit CT1, the driving circuit DR1, the high-side switch UG1, the low-side switch LG1, and an inductor L1. The slave power converter CVR2 includes the slave control circuit CT2, the driving circuit DR2, the high-side switch UG2, the low-side switch LG2, and an inductor L2.

One of two output terminals of the main control circuit CT1 is connected to an input terminal of the slave control circuit CT2, and another one of the two output terminals of the main control circuit CT1 is connected to an input terminal of the driving circuit DR1. Two output terminals of the driving circuit DR1 are correspondingly connected to a control terminal of the high-side switch UG1 and a control terminal of the low-side switch LG1.

A first terminal of the high-side switch UG1 is connected to an input voltage PVIN. A second terminal of the high-side switch UG1 is connected to a first terminal of the low-side switch LG1. A second terminal of the low-side switch LG1 is connected to a grounding voltage PGND. A node LX1 between the high-side switch UG1 and the low-side switch LG1 is connected to a first terminal of the inductor L1. A second terminal of the inductor L1 is correspondingly connected to a first terminal of a capacitor C and a first terminal of a load LD. A second terminal of the capacitor C and a second terminal of the load LD each are grounded.

Circuit components in the slave power converters CVR2 to CVRn are configured in a similar manner as that of the main control circuit CT1, and descriptions for similar configuration are not reiterated herein.

The connection between the main control circuit CT1 of the main power converter CVR1 and the slave control circuits CT2 to CTn of the plurality of power converters CVR2 to CVRn is as described above, and similar descriptions are not reiterated herein.

Figure 4:
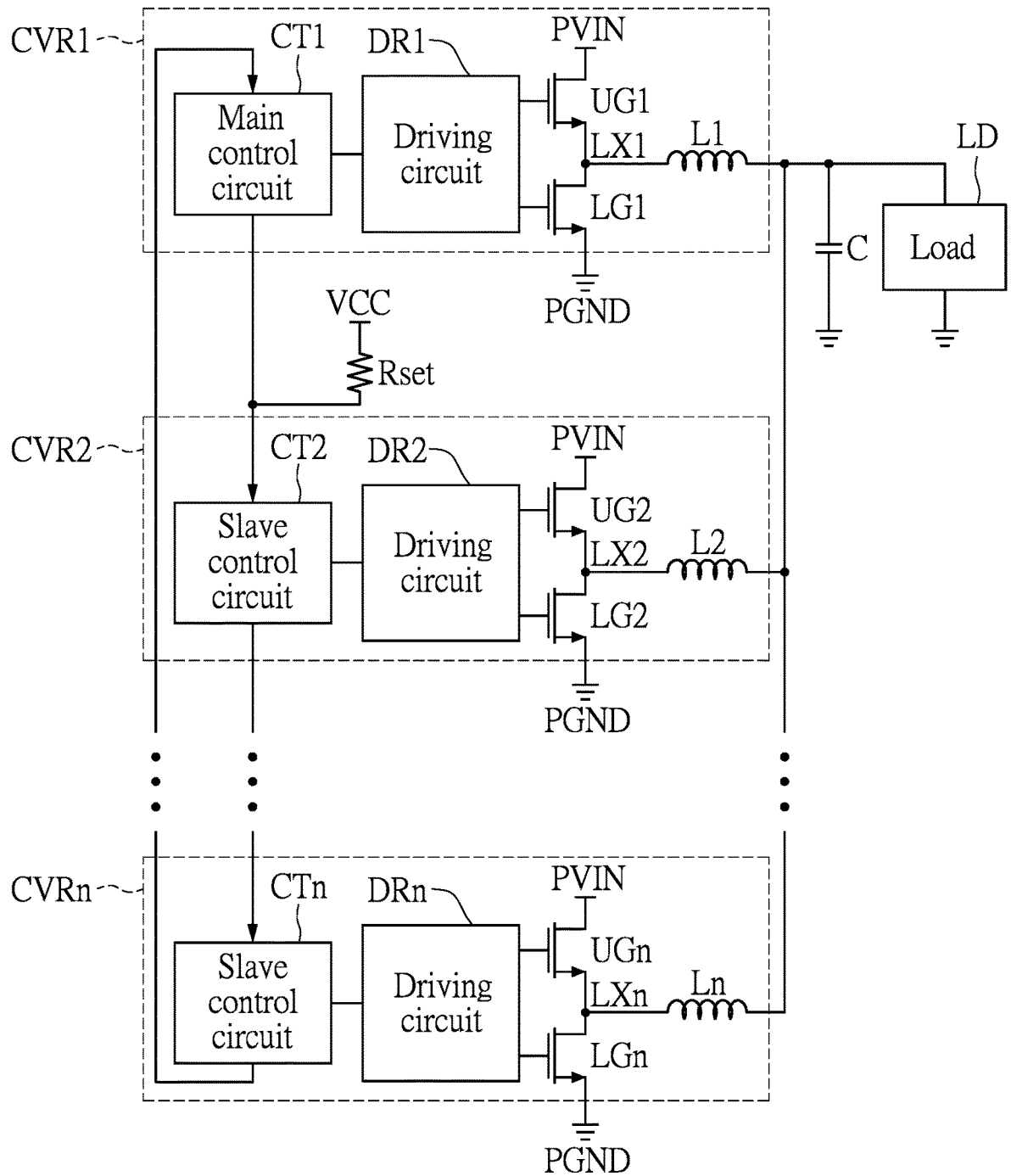
FIG. 4 is a schematic circuit layout diagram showing an output terminal of a main control circuit of the multiphase power converter being connected to a resistor according to one embodiment of the present disclosure.

Referring to FIG. 4, FIG. 4 is a schematic circuit layout diagram showing an output terminal of a main control circuit of the multiphase power converter being connected to a resistor according to one embodiment of the present disclosure.

In order to set one of the control circuits as the main control circuit and the rest of the control circuits as the slave control circuits, the same pin on the output terminal of the main control circuit can be connected to different circuit components or reference potentials, such as zero potential or non-zero potentials. Because the setting of the main control circuit is only performed at a start of the operation, pins can be possibly saved.

For example, as shown in FIG. 4, one of two output terminals of the main control circuit CT1 is connected to one terminal of a resistor Rset, and another terminal of the resistor Rset is connected to a common voltage VCC. The rest of the control circuits are set as the slave control circuits CT2 to CTn.

After setting the main control circuit CT1 and the slave control circuits CT2 to CTn as described above, in step S103, each of the control circuits can detect a resistance value, a reference potential value, or a current value of one of the terminal/pin thereof, so as to determine whether or not the detected control circuit is the main control circuit CT1.

Figure 5:
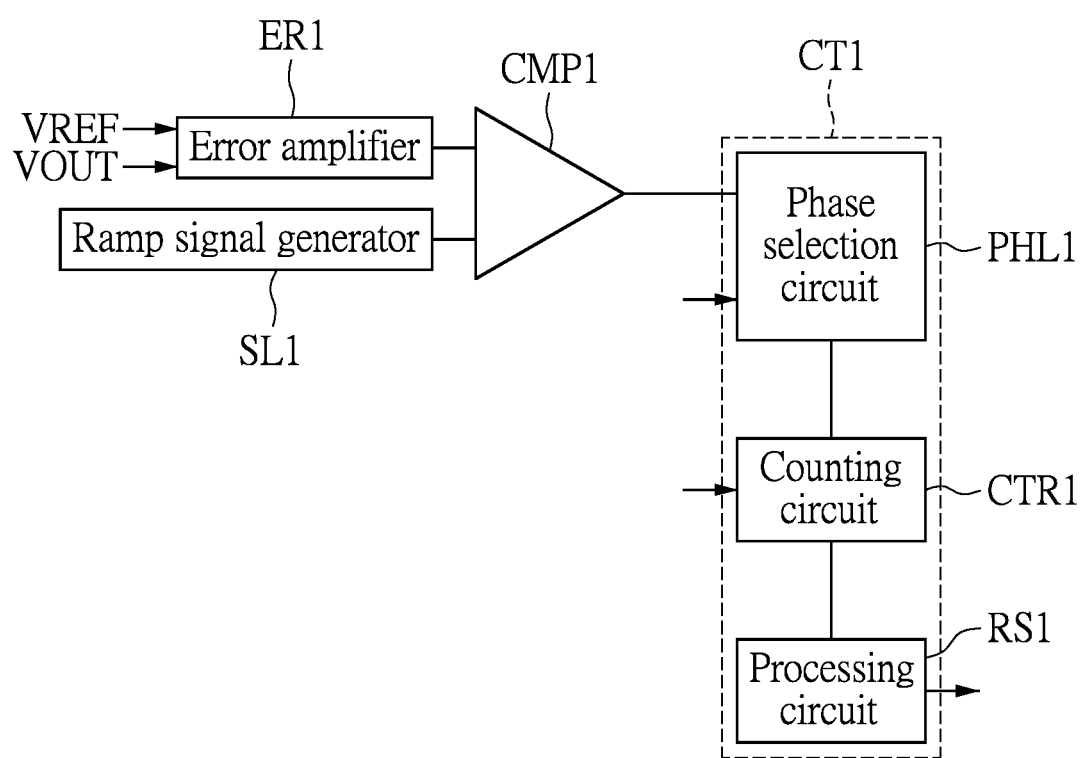
FIG. 5 is a schematic circuit layout diagram of internal circuit components of the daisy chain control circuit according to one embodiment of the present disclosure.

Referring to FIG. 5, FIG. 5 is a schematic circuit layout diagram of internal circuit components of the daisy chain control circuit according to one embodiment of the present disclosure.

The main power converter CVR1 as shown in FIG. 3 and FIG. 4 can include, as shown in FIG. 5, an error amplifier ER1, a ramp signal generator SL1, a comparator CMP1, and the main control circuit CT1. The main control circuit CT1 can include, as shown in FIG. 5, a phase selection circuit PHL1, a counting circuit CTR1, and a processing circuit RS1.

One of two input terminals of the error amplifier ER1 can be coupled to a reference voltage VREF. Another one of the two input terminals of the error amplifier ER1 can be connected to the node LX1 between the inductor L1 and the capacitor C as shown in FIG. 3 or FIG. 4, so as to receive a voltage VOUT of such the node LX1. The error amplifier ER1 amplifies a difference between the reference voltage VREF and the voltage VOUT by a gain and outputs an error amplification signal.

Two input terminals of the comparator CMP1 receive the error amplification signal and a ramp signal from the error amplifier ER1 and the ramp signal generator SL1, respectively. The comparator CMP1 compares a voltage of the error amplifier ER1 and a voltage of the ramp signal generator SL1, so as to output a comparison signal.

Two input terminals of the phase selection circuit PHL1 of the main power converter CVR1 can correspondingly be connected to an output terminal of the comparator CMP1 and an output terminal of the slave control circuit CTn. A first input terminal of the phase selection circuit PHL1 can receive the comparison signal from the comparator CMP1. A second input terminal of the phase selection circuit PHL1 of the main power converter CVR1 can receive or output, as shown in FIG. 4, the resistor Rset value, the reference potential value, or the current value from the input terminal, the output terminal, or other terminals/pins of the detected main control circuit CT1. The phase selection circuit PHL1 can output the initial pulse width modulation signal (according to the comparison signal). Such the initial pulse width modulation signal can be directly outputted to the slave control circuit CT2, or transmitted to the slave control circuit CT2 sequentially through the counting circuit CTR1 and the processing circuit RS1.

An input terminal of the counting circuit CTR1 of the main control circuit CT1 can be connected to the output terminal of the slave control circuit CTn. When the counting circuit CTR1 of the main control circuit CT1 receives the pulse width modulation signal PWMn outputted by the slave control circuit CTn, the counting circuit CTR1 of the main control circuit CT1 automatically counts the quantity of the control circuits set up in the daisy chain control circuit, and outputs a counting signal to the processing circuit RS1. The processing circuit RS1 can output signals, such as the pulse synchronization signal as described above or a pulse control signal as described below, for controlling the operation of the slave control circuits CT2 to CTn according to the counting signal.

Figure 6:
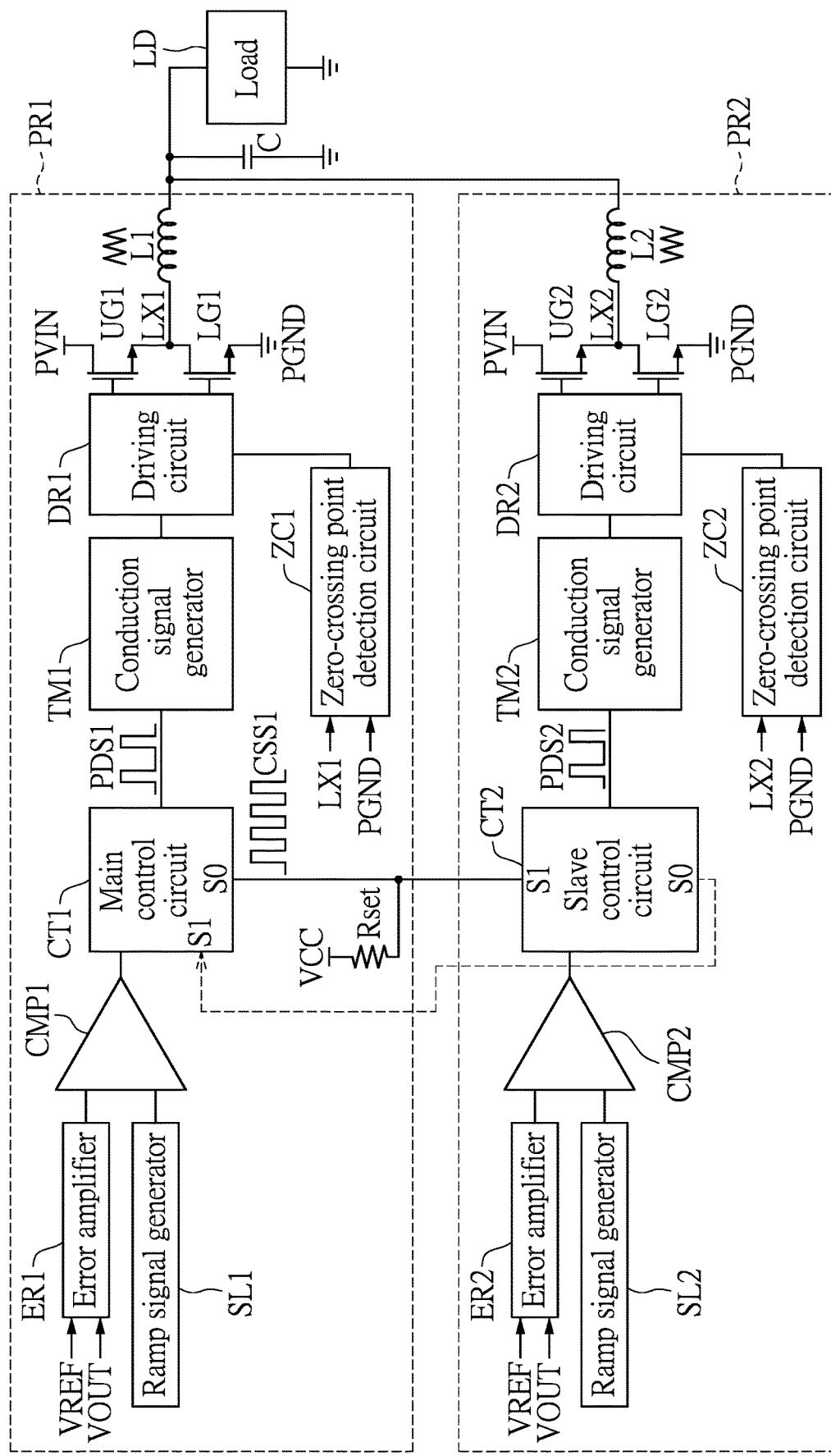
FIG. 6 is a schematic circuit layout diagram of the multiphase power converter according to another embodiment of the present disclosure.

Referring to FIG. 6, FIG. 6 is a schematic circuit layout diagram of the multiphase power converter according to another embodiment of the present disclosure. As shown in FIG. 6, for example, a two-phase power converter, which includes a main power converter PR1 and a slave power converter PR2, is set up. In practice, more slave power converters can be added therein as described above.

The main power converter PR1 includes, as described above, the error amplifier ER1, the ramp signal generator SL1, the comparator CMP1, the main control circuit CT1, the driving circuit DR1, the high-side switch UG1, the low-side switch LG1, and the inductor L1. As shown in FIG. 6, the main control circuit CT1 can include, as shown in FIG. 5, the phase selection circuit PHL1, the counting circuit CTR1, and the processing circuit RS1. The similar descriptions are not reiterated herein.

In addition, the main power converter PR1 can further include a conduction signal generator TM1 and a zero-crossing point detection circuit ZC1. The conduction signal generator TM1 can be connected to the processing circuit RS1 and the driving circuit DR1 of the main control circuit CT1. The zero-crossing point detection circuit ZC1 can be connected to the driving circuit DR1 and the node LX1.

The zero-crossing point detection circuit ZC1 can detect whether or not the current flowing through the node LX1 reaches zero value, and output the detected current value of the node LX1 to the driving circuit DR1. The driving circuit DR1 can drive the high-side switch UG1 and the low-side switch LG1 according to the received current value of the node LX1.

It should be noted that, the main control circuit CT1 generates a pulse control signal CSS1 according to the counting signal as described above, and the pulse control signal CSS1 has a plurality of pulses as shown in FIG. 6.

The processing circuit RS1 of the main control circuit CT1 outputs the first pulse of a first switch control signal PDS1 according to the first pulse of the first cycle of the pulse control signal CSS1. Then, the slave control circuit CT2 of the slave power converter PR2 outputs the first pulse of a second switch control signal PDS2 according to the second pulse of the first cycle of the pulse control signal CSS1.

Repeatedly, the processing circuit RS1 of the main control circuit CT1 outputs the second pulse of the first switch control signal PDS1 according to the first pulse of the second cycle of the pulse control signal CSS1. Then, the slave control circuit CT2 of the slave power converter PR2 outputs the second pulse of the second switch control signal PDS2 according to the second pulse of the second cycle of the pulse control signal CSS1.

The conduction signal generator TM1 of the main power converter PR1 can output a first conduction signal according to the first switch control signal PDS1. The driving circuit DR1 can output a first driving signal according to the first conduction signal, so as to drive the high-side switch UG1 and the low-side switch LG1.

A conduction signal generator TM2 of the slave power converter PR2 can output a second conduction signal according to the second switch control signal PDS2. The driving circuit DR2 can output a second driving signal according to the second conduction signal, so as to drive the high-side switch UG2 and the low-side switch LG2.

It should be understood that, in the present embodiment, two power converters are exemplarily provided. Accordingly, two pulses of the pulse control signal CSS1 are used as a cycle, and the main power converter PR1 and the slave power converter PR2 operate alternatively according to the first pulse and the second pulse of each cycle of the pulse control signal CSS1, respectively. However, the present disclosure in not limited to the example described above. In practice, more power converters can be set up in the multiphase power converter. For example, if n power converters are set up in the multiphase power converter, n pulses of the pulse control signal CSS1 are used as a cycle.

Beneficial Effects of the Embodiment

In conclusion, the multiphase power converter having the daisy chain control circuit and the method for controlling the same are provided in the present disclosure. After the power in turned on, the one of the control circuits of the daisy chain control circuit can be automatically determined as the main control circuit, and the rest of the control circuits of the daisy chain control circuit are determined as the slave control circuits. In addition, the quantity of the power converters is automatically determined, and the main control circuit controls the operation of the slave control circuits, so as to provide an appropriate current to the load.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multiphase power converter having a daisy chain control circuit, comprising:
a plurality of power converters each having a control circuit, wherein the control circuit of each of the plurality of power converters has an input terminal and an output terminal, the plurality of control circuits respectively of the plurality of power converters are arranged in sequence with each other, the input terminal of a first one of the plurality of control circuits is connected to the output terminal of a last one of the plurality of control circuits, and the input terminal of each of the plurality of control circuits except for the first one of the plurality of control circuits is connected to the output terminal of a previous one of the plurality of control circuits, and the plurality of power converters include:

a main power converter, wherein the control circuit of the main power converter is defined as a main control circuit; and a plurality of slave power converters, wherein the control circuit of each of the plurality of slave power converters is defined as a slave control circuit;

wherein the main power converter outputs an initial pulse width modulation signal having a plurality of initial pulses to the slave control circuit having the input terminal connected to the output terminal of the main control circuit;

wherein the input terminal of the slave control circuit that is connected to the output terminal of the main control circuit receives the initial pulse width modulation signal from the main control circuit, and obtains one of the plurality of initial pulses from the received initial pulse width modulation signal, so as to output a pulse width modulation signal having the plurality of initial pulses except for the one of the plurality of initial pulses to the next slave control circuit;

wherein ones of the slave control circuits respectively of the plurality of slave power converters are not directly connected to the main control circuit, each of the ones of the slave control circuits that are not directly connected to the main control circuit receive the pulse width modulation signal from the previous one of the slave control circuits and obtains another of the initial pulses from the received pulse width modulation signal, so as to output the next pulse width modulation signal having the plurality of initial pulses except for the one and the another of the plurality of initial pulses to the next slave control circuit;

wherein the slave control circuit having the output terminal that is connected to the input terminal of the main control circuit obtains the other of the plurality of initial pulses from the received pulse width modulation signal, so as to output the pulse width modulation signal having the plurality of initial pulses except for the one, another and the other of the plurality of initial pulses to the main control circuit;

wherein the main control circuit calculates a difference between a quantity of the initial pulses of the initial pulse width modulation signal and a quantity of the initial pulses of the pulse width modulation signal to calculate a quantity of the control circuits.

2. The multiphase power converter according to claim 1, wherein, after the main control circuit receives the pulse width modulation signal from the slave control circuit connected to the main control circuit, the main control circuit outputs a counting signal, and automatically counts the quantity of the control circuits during a period of the counting signal.

3. The multiphase power converter according to claim 2, wherein, after the period of the counting signal ends, the main control circuit outputs a pulse synchronization signal sequentially transmitted to each of the slave control circuits, so as to control a synchronized operation of the plurality of power converters.

4. The multiphase power converter according to claim 3, wherein a pulse width of the pulse synchronization signal is different from a width of each of the initial pulses of the initial pulse width modulation signal.

5. The multiphase power converter according to claim 3, wherein, after the main control circuit is synchronized with the slave control circuits, the main control circuit outputs a pulse control signal, and a plurality of pulses of the pulse control signal correspondingly activate operations of the main control circuit and the slave control circuits.

6. The multiphase power converter according to claim 1, wherein, after the main control circuit receives the pulse width modulation signal, the main control circuit outputs a pulse synchronization signal sequentially transmitted to each of the slave control circuits, so as to control a synchronized operation of the plurality of power converters.

7. The multiphase power converter according to claim 6, wherein a pulse width of the pulse synchronization signal is different from a width of each of the initial pulses of the initial pulse width modulation signal.

8. The multiphase power converter according to claim 6, wherein, after the main control circuit is synchronized with the slave control circuits, the main control circuit outputs a pulse control signal, and a plurality of pulses of the pulse control signal correspondingly activate operations of the main control circuit and the slave control circuits.

9. The multiphase power converter according to claim 1, wherein the output terminal of one of the control circuits is connected to a resistor, so as to set the one of the control circuits as the main control circuit.

10. The multiphase power converter according to claim 1, wherein the output terminal of one of the control circuits is coupled to a reference potential, so as to set the one of the control circuits as the main control circuit.

11. A method for controlling a multiphase power converter having a daisy control circuit, comprising:

setting up a plurality of power converters each having a control circuit;

arranging the plurality of control circuits respectively of the plurality of power converters in sequence with each other;

connecting an input terminal of a first one of the plurality of control circuits to the output terminal of a last one of the plurality of the control circuits, and connecting the input terminal of each of the plurality of control circuits except for the first one of the plurality of control circuits is connected to the output terminal of a previous one of the plurality of control circuits;

setting one of the control circuits as a main control circuit, and setting the rest of the control circuits as a plurality of slave control circuits;

using the main control circuit to output an initial pulse width modulation signal having a plurality of initial pulses to the slave control circuit having the input terminal connected to the output terminal of the main control circuit;

using the input terminal of the slave control circuit that is connected to the output terminal of the main control circuit to receive the initial pulse width modulation signal from the main control circuit, and to obtain one of the initial pulses from the received pulse width modulation signal, so as to output a pulse width modulation signal having the plurality of initial pulses except for the one of the plurality of initial pulses to the next slave control circuit;

using ones of the slave control circuits respectively of the plurality of slave power converters to be directly connected to the main control circuit, using each of the ones of the slave control circuits that are not directly connected to the main control circuit to receive the pulse width modulation signal from the previous one of the slave control circuits and to obtain another of the plurality of initial pulses from the received pulse width modulation signal, so as to output the next pulse width modulation signal having the plurality of initial pulses except for the one and the another of the plurality of initial pulses to the next slave control circuit;

using the slave control circuit having the output terminal connected to the input terminal of the main control circuit to obtain another of the plurality of initial pulses from the received pulse width modulation signal, so as to output the pulse width modulation signal having the plurality of initial pulses except for the one, another and the other of the plurality of initial pulses to the main control circuit; and using the main control circuit to calculates a difference between a quantity of the initial pulses of the initial pulse width modulation signal and a quantity of the initial pulses of the pulse width modulation signal to calculate a quantity of the control circuits.

12. The method according to claim 11, further comprising:

using the main control circuit to output a counting signal and automatically count the quantity of the control circuits during a period of the counting signal after the main control circuit receives the pulse width modulation signal from the slave control circuit connected to the main control circuit.

13. The method according to claim 12, further comprising:

using the main control circuit to output a pulse synchronization signal sequentially transmitted to each of the slave control circuits, so as to control a synchronized operation of the plurality of power converters after the period of the counting signal ends.

14. The method according to claim 13, further comprising:

using the main control circuit to output a pulse control signal, and using a plurality of pulses of the pulse control signal to correspondingly activate operations of the main control circuit and the plurality of slave control circuits after the main control circuit is synchronized with the plurality of slave control circuits.

15. The method according to claim 11, further comprising:

using the main control circuit to output a pulse synchronization signal sequentially transmitted to each of the slave control circuits, so as to control a synchronized operation of the plurality of power converters after the main control circuit receives the pulse width modulation signal.

16. The method according to claim 15, further comprising:

using the main control circuit to output a pulse control signal, and using a plurality of pulses of the pulse control signal to correspondingly activate operations of the main control circuit and the plurality of slave control circuits after the main control circuit is synchronized with the plurality of slave control circuits.

17. The method according to claim 11, further comprising:

connecting the output terminal of one of the control circuits to a resistor, so as to set the one of the control circuits as the main control circuit.

18. The method according to claim 11, further comprising:

coupling the output terminal of one of the control circuits to a reference potential, so as to set the one of the control circuits as the main control circuit.

* * * * *